INVENTOR
TED C. EVANS

ATTORNEY

3,552,789
PRESSURE VESSEL HEAD RETAINER
Ted C. Evans, Olean, N.Y., assignor to Dresser Industries,
Inc., Dallas, Tex., a corporation of Delaware
Filed Oct. 10, 1968, Ser. No. 766,436
Int. Cl. B65d 45/32, 53/02
U.S. Cl. 292—256.6                    9 Claims

ABSTRACT OF THE DISCLOSURE

An enclosure for a barrel-type centrifugal compressor or other pressure vessel consisting of a cylindrical casing closed by end heads received within the cylindrical casing in sealed relation therewith. The case is provided with an internal annular groove which accommodates a retainer ring assembly consisting of a shear ring and a locking ring, each made up of several segments. The shear ring is generally rectangular in cross section and is provided with an axially extending annular lip, which overlies the periphery of the end head, and with an external bearing surface for engaging the groove bottom. The locking ring occupies the space in the groove between its outer face and the shear ring. The shear ring segments and locking ring segments are bolted together to form an integral retainer ring assembly. Rotation of the retainer ring assembly, under loading in shear, is prevented by the lip and bearing surface.

BACKGROUND OF THE INVENTION

In barrel-type centrifugal compressors designed for high pressures, it has been conventional practice to secure the end covers or heads to the cylindrical casing by means of a bolt ring. This type of structure has a number of disadvantages. One of these disadvantages is the cost of the structure necessitated by the many machining operations such as boring and tapping the casing, drilling the head, and providing extra heavy, fully-machined studs and nuts for securing the head to the casing. Furthermore, this structure results in an inherently high assembly cost, resulting from the individual operations of turning the studs into the case and assembling of the nuts onto the studs, and from the necessity for proper and uniform torquing of the nuts. The cost of maintenance requiring removal and reassembly of the heads is also high for the same reasons, and for the additional reasons that disassembly of the heads may be further complicated by seizing of the nuts on the studs, by damage to the stud threads and by corrosion, all making it difficult to disassemble the end head from the casing.

The retaining of the end heads within a cylindrical casing by means of a retaining ring provides a basically simple structure both from the fabrication and maintenance standpoint, and offers opportunity for reducing the mass and weight of the parts. Further, an intrinsic value of the retaining ring structure is that the head is uniformly supported around its periphery; and, correspondingly, the case is uniformly loaded. Inherently, then, areas of high stress are eliminated.

Because a retainer ring is loaded in shear, the high loading produced by a high pressure machine may tend to rotate or twist the retaining ring permitting undesirable movement of the retained head.

It is the principal object of this invention to provide an improved retaining ring for the end head of a pressure vessel which obviates the tendency to rotate or twist under high shear load.

SUMMARY OF THE INVENTION

A retaining assembly for the end head of a pressure vessel which is received within a cylindrical case includes an internal annular groove in the case and a retainer ring having bearing surfaces for transferring the axial load from the periphery of the head to the casing groove wall, and having an axially inward projecting lip overlying the periphery of the end head to prevent rotation of the retaining ring under shear load.

BRIEF DESCRIPTION OF THE DRAWING

The invention is illustrated by way of example in the attached drawing in which.

DESCRIPTION OF THE PREFERRED EMBODIMENT

Figure 1:
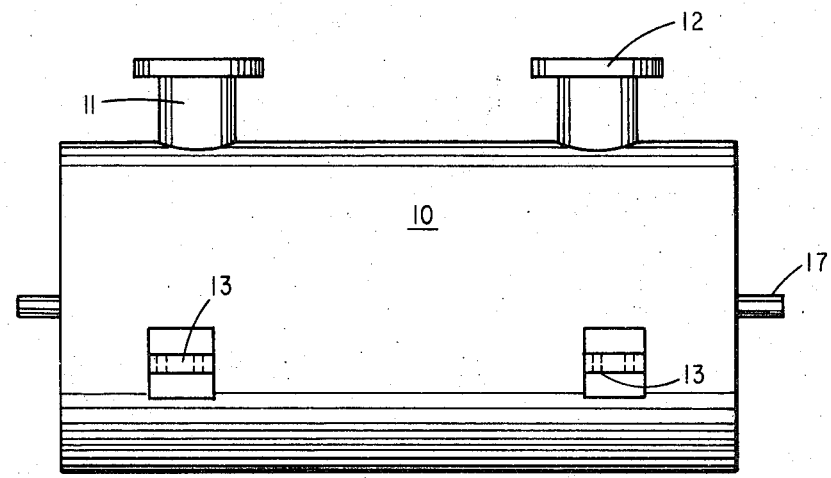
FIG. 1 is a side elevation view of a pressure vessel such as a barrel-type centrifugal compressor.

FIG. 1 is a side elevation of a barrel-type centrifugal compressor, for example, in which the compressor housing is defined by a cylindrical casing 10, closed at its opposite ends by end covers or heads (not shown in this view). The compressor housing includes intake and discharge bosses 11 and 12, with flange connections, and support brackets 13.

Compressors of this type designed for high pressures have a heavy-walled cylindrical casing which may be a forging. The internal bore of such casing is generally uniform to accommodate the so-called "internals" of a centrifugal compressor; however, the bore may be enlarged at its outer ends to define outward facing shoulders 14 to locate the end heads 15, as best seen in FIG. 3.

Figure 2:
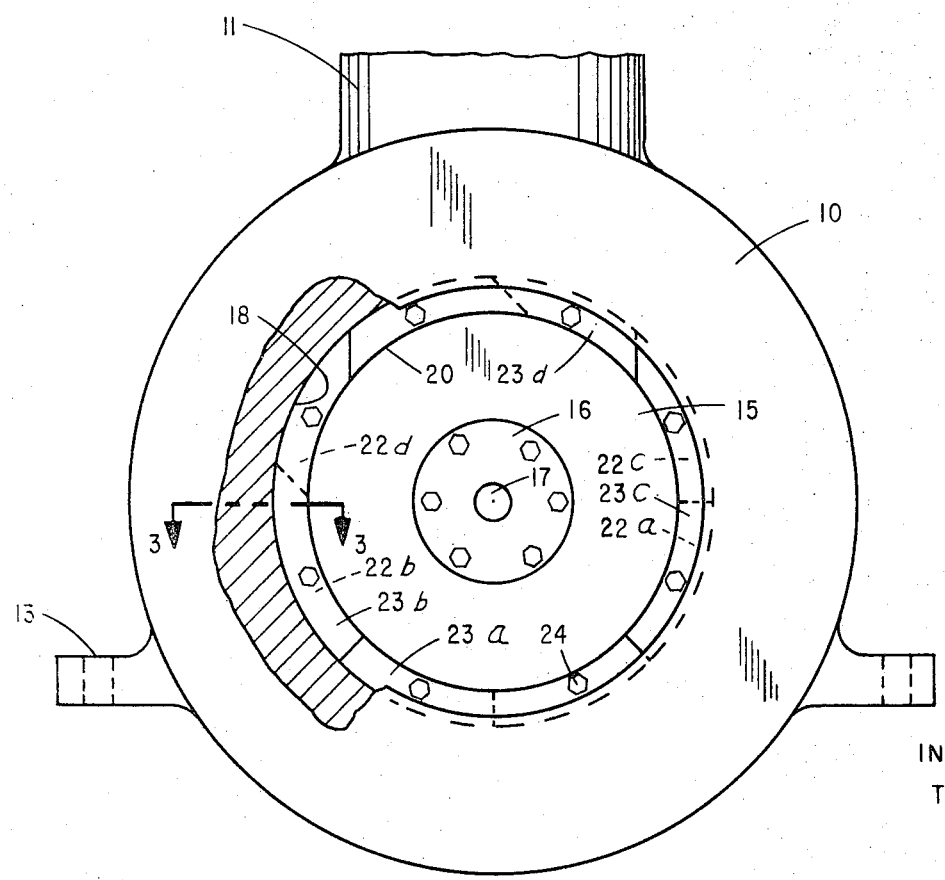
FIG. 2 is an end view of the vessel of FIG. 1, partially broken away.

FIG. 2 is an end view of the compressor casing showing one end head 15, and being partially broken away to show the structure of the retaining ring assembly 20. The end head 15 is a heavy disk like member which supports the shaft bearings and shaft seals for the compressor rotor assembly, and accordingly must be precisely and rigidly assembled to the cylindrical casing 10. In FIG. 2 there is shown, for example, a shaft seal access cover 16 secured to the head by means of suitable bolts and the projecting rotor shaft 17.

Figure 3:
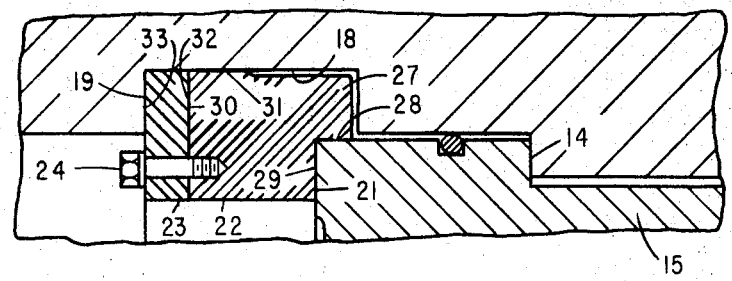
FIG. 3 is a fragmentary sectional view taken on line 3—3 of FIG. 2.

As best seen in FIGS. 2 and 3, the end head 15 is retained within the casing 10 by means of a retainer ring, which is an assembly received in an internal annular groove 18 in the casing 10 in the conventional manner of retaining rings. The annular groove 18 is generally rectangular in cross section and lies mostly axially outward of the outer peripheral face 21 of the head 15, but also extends axially inward of this peripheral face when the head is properly located on the shoulder 14. Outer groove face 19 is a load bearing surface.

The retaining ring 20 is an assembly of a shear ring 22 and a locking ring 23. The shear ring and locking ring are referred to as annular rings; however, each of these rings is actually made up of a plurality of abutting segments as will be described. The segments are bolted together by means of suitable bolts 24 to define an integral annular retaining ring assembly 20. The term "shear ring," is used for convenience to define one element of the retaining ring assembly; and, of course, this shear ring is loaded "in shear," as will be described more fully.

As best seen in FIG. 3, the retaining ring is generally rectangular in cross section, however being provided at one end, its inner end, with an axially extending peripheral lip 27. The lip 27 provides an internal cylindrical surface 28 having a diameter substantially the same as the outer diameter of the head periphery adjacent its forward face 21. In assembled relation the lip 27 overlies the head periphery, the surface 28 bearing on the peripheral surface of the head. The shear ring with its lip, then, defines an inward facing shoulder 29, in a radial plane, which in assembled relation bears against the peripheral face 21 of the head.

The outer face 30 of the shear ring lies in a radial plane and defines a load bearing surface which transfers the force acting on the head to the casing 10 through the locking ring 23 as will be described. The outer periphery of the shear ring, adjacent to its outer face 30, defines a peripheral bearing surface 31 having a diameter substantially equivalent to the diameter of the base of the annular groove 18 so that, in assembled relation, this bearing surface 31 will bear against the groove bottom.

Figure 4:
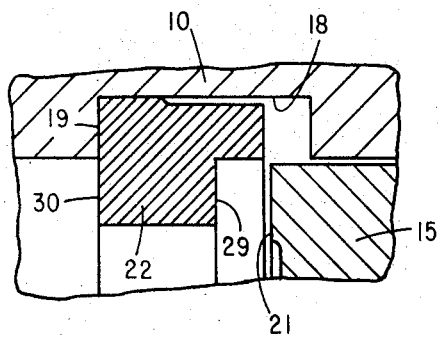
FIG. 4 is a view similar to FIG. 3 showing the parts in different relation.

In order to assemble the shear ring into the assembly, it will be seen that the total axial width of the shear ring 22 must be somewhat less than the axial distance between the casing groove face 19 and the head peripheral face 21. This is illustrated in FIG. 4, and suggests the necessary assembly operation in which a shear ring segment must first be inserted radially into the groove 18 and then shifted axially to the FIG. 3 position wherein the lip 27 overlies the head periphery.

Because of the necessary axial shifting of the shear ring, it is necessary to fill the space between the shear ring face 30 and the groove face 19 with a load bearing member which will transfer the load from the shear ring to the casing. The locking ring 23 performs this function and, as illustrated, is an annular ring having a generally rectangular cross section, providing an inner face 32 which abuts the face 30 of the shear ring and an outer face 33 which abuts the groove face 19. The axial dimensions are very closely controlled so that the total axial dimension between the locking ring face 33 and the shear ring face 29 is substantially the same as the axial distance between the groove face 19 and the head face 21, when the head is seated against the casing shoulder 14. The head 15 then is precisely located within the casing 10 in an axial direction; and the outer diameter of the head is dimensioned relative to the mating inner diameter of the casing to precisely locate the head in a radial direction.

It is preferred that both the locking ring 23 and the shear ring 22 be made up of four generally equal segments; and a preferred arrangement is illustrated in FIG. 2. In this view the several segments of the locking ring 23 are seen in full and the several segments of the shear ring 22 are seen only in dotted line representation since they lie behind the locking ring. It will be seen that the locking ring is made up of four substantially equal segments 23a, 23b, 23c, and 23d. It will further be seen that the joints between a and b segments and the a and c segments of the locking ring are radial joints while the joints between the b and d segments and the c and d segments lie in planes which are parallel to the rotational axis of the compressor. Referring to the dotted line representation of the shear ring 22, it will be seen that the shear ring is also made up of four substantially equal segments 22a, 22b, 22c, and 22d. The joints of the shear ring segments have the same relative arrangement as those of the locking ring segments; namely, that the joints between the shear ring segments a and b and a and c are radial while the joints between the shear ring segments d and b and d and c lie in parallel planes.

The purpose of the segmental and joint arrangement is, of course, for ease of assembly and disassembly. The shear ring segments are inserted first radially into the casing groove and then shifted axially to position the respective lips 27 over the head periphery. Segment 22d with its parallel end surfaces is, of course, the last to be inserted to complete the shear ring assembly. The locking ring segments are then inserted radially; and the segment 23d with its parallel end surfaces is the last to be inserted to complete the locking ring assembly.

While the shear ring segments are radially self-retaining, by reason of the respective overlying lips 27, it is necessary to provide means for retaining the locking ring segments from radial movement. A convenient method for doing this is to secure the locking ring segments to the shear ring segments, and this is done by means of suitable bolts. An additional advantage of this bolting method, along with the rotational staggering of the respective joints, is the production of a rigid retainer ring assembly composed of the eight segments of the shear ring and the locking ring. As seen in FIG. 2, the joints are staggered uniformly; and eight bolts 24 are provided to lock the retaining ring assembly together, two bolts passing through each segment of the respective rings. This rigid retaining ring assembly helps to prevent rotation of the ring under the applied shear load as will be described.

Figure 5:
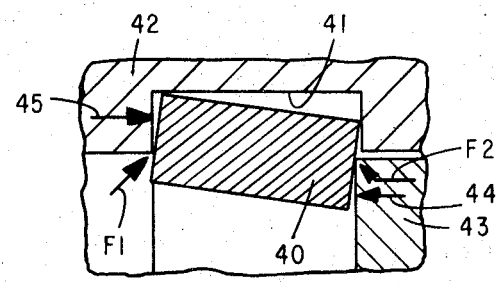
FIG. 5 is a diagram illustrating the effect of shear loading on a retainer ring of rectangular cross section.

FIG. 5 is a diagrammatic representation of a known retaining ring assembly, wherein a retaining ring 40 having a rectangular cross section is received in an annular groove 41 in a cylindrical casing 42 and axially retains a head member 43. The pressures within the vessel produce a force which urges the head axially outward as indicated by the force arrow 44; and this force is resisted by an equal and opposite force represented by the arrow 45 this being the resistant force presented by the outer face of the casing groove 41. Because these forces are radially offset, the retainer ring 40 is loaded in shear which tends to rotate the ring in a clockwise direction as viewed and illustrated in FIG. 5. When any degree of rotation occurs, there is a high concentration of force or stress applied at the points indicated by the arrows $F_1$ and $F_2$. The above-mentioned rotation initially permits some axial movement of the head 43 which is undesirable in certain applications and certainly in the case of a centrifugal compressor as described above. Furthermore, the high concentration of force may produce plastic deformation of the retaining ring and/or the respective bearing points of the casing or head, resulting in further axial movement of the head 43.

Figure 6:
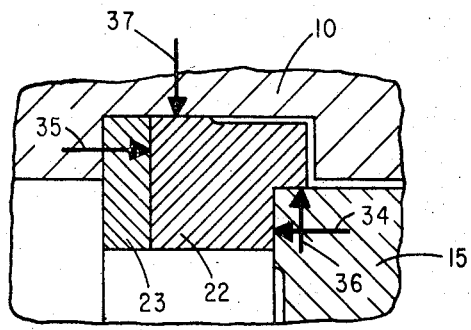
FIG. 6 is a diagram illustrating the forces acting on the retaining ring of FIG. 3.

The retaining ring structure of the present invention obviates the above-mentioned disadvantages of a retaining ring structure as illustrated in FIG. 5. FIG. 6 is a representation of the retaining ring arrangement of the present invention, based on FIG. 3, and indicating the forces acting on the shear ring. With this arrangement the shear ring 22 is also loaded in shear; the forces developed by the pressure within the compressor acting on the head 15 to urge the head axially outward. This load force, represented by the arrow 34, is transferred axially from the head surface 21 to the shear ring surface 29, and then from the shear ring surface 30 to the casing 10 through the locking ring 23. The axial force absorbed by the casing is represented by arrow 35. Any tendency of the shear ring to rotate in a clockwise direction, as viewed in FIGS. 3 and 6, is now resisted by a counterclockwise force couple represented by the arrows 36 and 37. The force arrow 36 represents resistance by the peripheral surface of the head 15 to inward movement of the shear ring surface 28; and the force arrow 37 represents resistance by the casing 10 at the bottom of the groove 18 to outward movement of the shear ring peripheral surface 31. With this arrangement, there is no opportunity for undesirable axial shifting of the head 15; and load exerted by the head is, at all times, uniformly absorbed by the casing 10.

The embodiments of the invention in which an exclusive property or privilege is claimed are defined as follows:

1. A pressure vessel including a cylindrical wall and an end wall having inner and outer faces received within said cylindrical wall;

retaining means for said end wall comprising an internal annular groove in said cylindrical wall and a retaining ring disposed in said groove engaging the outer face of said end wall;

said annular groove extending axially inward of the outer face of said end wall forming an inwardly facing surface, a bottom surface and an outwardly facing surface;

said retaining ring including a segmented locking ring having an outer bearing surface engaging the inwardly facing surface of said groove and having an inner bearing surface, and a segmented shear ring having an inward extending lip disposed to overlie the outer periphery of said end wall, an inner bearing surface engaging the outer face of said end wall, a peripheral bearing surface adjacent its outer face for engaging the bottom surface of said annular groove, and an outer bearing surface engaging the inner bearing surface of said locking ring.

2. The invention set forth in claim 1 wherein said lip defines an internal cylindrical surface having a diameter substantially the same as that of the periphery of said end wall.

3. The invention set forth in claim 1 wherein said shear ring is provided with an annular peripheral boss adjacent its outer face defining an external cylindrical surface having a diameter substantially the same as that of the bottom surface of said groove, said external cylindrical surface defining said bearing surface for engaging the bottom surface of said groove.

4. The invention set forth in claim 1 wherein said inwardly facing surface of said annular groove is in a radial plane spaced a first distance axially from the outer face of said end wall; wherein said shear ring and locking ring have a total axial dimension less than said first distance; and wherein said locking ring occupies the space between said shear ring and the inwardly facing surface of said groove.

5. The invention set forth in claim 4 wherein said locking ring is generally rectangular in cross section and the inner and outer bearing surfaces thereon are in radial planes spaced a second fixed distance from each other; wherein the inner and outer bearing surfaces on said shear ring are in radial planes spaced apart a third fixed distance; and wherein said second and third fixed distances are substantially equal to said first fixed distance to prevent any outward movement of said end wall relative to said casing.

6. The invention set forth in claim 1 wherein said locking ring is bolted to said shear ring to define a rigid retainer ring assembly.

7. The invention set forth in claim 1 wherein each of said shear ring and said locking ring are made up of a plurality of adjacent segments having abutting ends; and means for retaining said locking ring segments within said groove.

8. A pressure vessel including a cylindrical wall and an end wall having inner and outer faces received within said cylindrical wall:

retaining means for said end wall comprising an internal annular groove in said cylindrical wall extending axially inward of the outer face of said end wall forming an inwardly facing surface, a bottom surface and an outwardly facing surface, and a retaining ring disposed in said groove engaging the outer face of said end wall;

said retaining ring including a segmented locking ring having an outer bearing surface engaging the inwardly facing surface of said groove and a segmented shear ring having an inwardly extending lip disposed to overlie the outer periphery of said end wall and a peripheral bearing surface adjacent its outer face for engaging the bottom surface of said annular groove, each of said shear ring and locking ring being made up of a plurality of adjacent segments having abutting ends, the joints of said locking ring being staggered relative to the joints of said shear ring, and means securing the shear ring and locking ring together to define a rigid annular retaining ring assembly, said locking ring defining a bearing member for transferring the axial load from said shear ring to the inwardly facing surface of said groove.

9. A retainer ring for retaining an end wall in a cylindrical casing comprising:

a segmented shear ring and a segmented blocking ring;

means for securing said shear ring and said locking ring in an integral assembly wherein the joints of said locking ring are rotationally displaced from the joints of said shear ring; and said shear ring includes an axially facing bearing surface engaging the face of the end wall and a radially inwardly facing bearing surface for engaging the periphery of said end wall.

References Cited
UNITED STATES PATENTS

| | | | |
|---|---|---|---|
| 2,196,895 | 4/1940 | Bowman | 220—46 |
| 2,203,364 | 6/1940 | Rathbun | 292—256.6 |
| 2,213,410 | 9/1940 | Rathbun | 220—46 |
| 2,342,186 | 2/1944 | Fischer | 220—46 |
| 2,729,491 | 1/1956 | Sieder | 292—256.6 |
| 2,742,175 | 4/1956 | Parilla | 220—46X |

MARVIN A. CHAMPION, Primary Examiner

E. J. McCARTHY, Assistant Examiner

U.S. Cl. X.R.

220—46